US009373080B1

(12) United States Patent
Satish

(10) Patent No.: US 9,373,080 B1

(45) Date of Patent: Jun. 21, 2016

(54) USING HISTORICAL ACCURACY OF USER DECISION MAKING TO IMPROVE ACCURACY OF PREDICTIVE MODELING BASED AUTOMATIC CLASSIFICATION

(71) Applicant: Sourabh Satish, Fremont, CA (US)

(72) Inventor: Sourabh Satish, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 500 days.

(21) Appl. No.: 13/626,738

(22) Filed: Sep. 25, 2012

(51) Int. Cl.
*G06N 5/02* (2006.01)

(52) U.S. Cl.
CPC .................................... *G06N 5/022* (2013.01)

(58) Field of Classification Search
None
See application file for complete search history.

(56) References Cited

U.S. PATENT DOCUMENTS

| | | | | |
|---|---|---|---|---|
| 8,438,184 B1 * | 5/2013 | Wang | H04L 67/02 | 707/780 |
| 2011/0071967 A1 * | 3/2011 | Fung | G06F 19/327 | 706/12 |
| 2013/0262096 A1 * | 10/2013 | Wilhelms-Tricarico | G10L 25/90 | 704/202 |

OTHER PUBLICATIONS

Craig L. Fancourt and Jose C. Principe, “Modeling Time Dependencies in the Mixture of Experts”, Neural Networks Proceedings, 1998. IEEE World Congress on Computational Intelligence. The 1998 IEEE International Joint Conference on (vol. 3 ), May 4-9, 1998 , pp. 2324-2327.*

Vikas C. Raykar, Shipeng Yu, Linda H. Zhao, Anna Jerebko, Charles Florin, Gerardo Hermosillo Valadez, Luca Bogoni, Linda Moy, “Supervised learning from multiple experts: whom to trust when everyone lies a bit”, ICML ’09 Proceedings of the 26th Annual International Conference on Machine Learning, Jun. 14-18, 2009, pp. 889-896.*

Vikas C. Raykar, Linda H. Zhao, Gerardo Valadez, Charles Florin, Luca Bogoni, Linda Moy, “Learning from Crowds”, Journal of Machine Learning Research, vol. 11, 2010, pp. 1297-1332.*

Aleksander Kolcz, Wen-tau Yih, “Raising the Baseline for High-Precision Text Classifiers”, KDD’07, Aug. 12-15, 2007, San Jose, California, USA, 2007, pp. 1-10.*

Liyue Zhao, Gita Sukthankar, Rahul Sukthanka, “Robust Active Learning Using Crowdsourced Annotations for Activity Recognition”, Human Computation: Papers from the 2011 AAAI Workshop (WS-11-11), 2011, pp. 74-79.*

* cited by examiner

*Primary Examiner* — Kakali Chaki
*Assistant Examiner* — Walter Hanchak
(74) *Attorney, Agent, or Firm* — Patent Law Works LLP

(57) ABSTRACT

A plurality of user made decisions concerning unknown data objects are received from a plurality of users. Each specific user made decision concerns a specific unknown data object made by a specific user, wherein the specific decision could not be made automatically with a sufficient level of confidence without user input. Accuracy of the received user made decisions is automatically determined, as empirical data determinative of the accuracy of the decisions becomes available over time. User weights are automatically dynamically calculated, based on the determined accuracy of decisions made by associated users. Multiple user made decisions received from multiple users concerning a specific unknown data object are aggregated, taking into account the user weights. A definitive decision concerning the specific unknown data object is automatically made without prompting any user for confirmation, based on the aggregating of the user made decisions concerning the specific unknown data object.

20 Claims, 4 Drawing Sheets

401 Receive Plurality of User Made Decisions
403 Store User Made Decisions
405 Glean Current Empirical Data
407 Determine Accuracy of User Made Decisions
409 Automatically Calculate User Weights Based on Accuracy of Decisions
411 Aggregate User Made Decisions Taking Weights Into Account
413 Make Definitive Decision Based on Aggregation

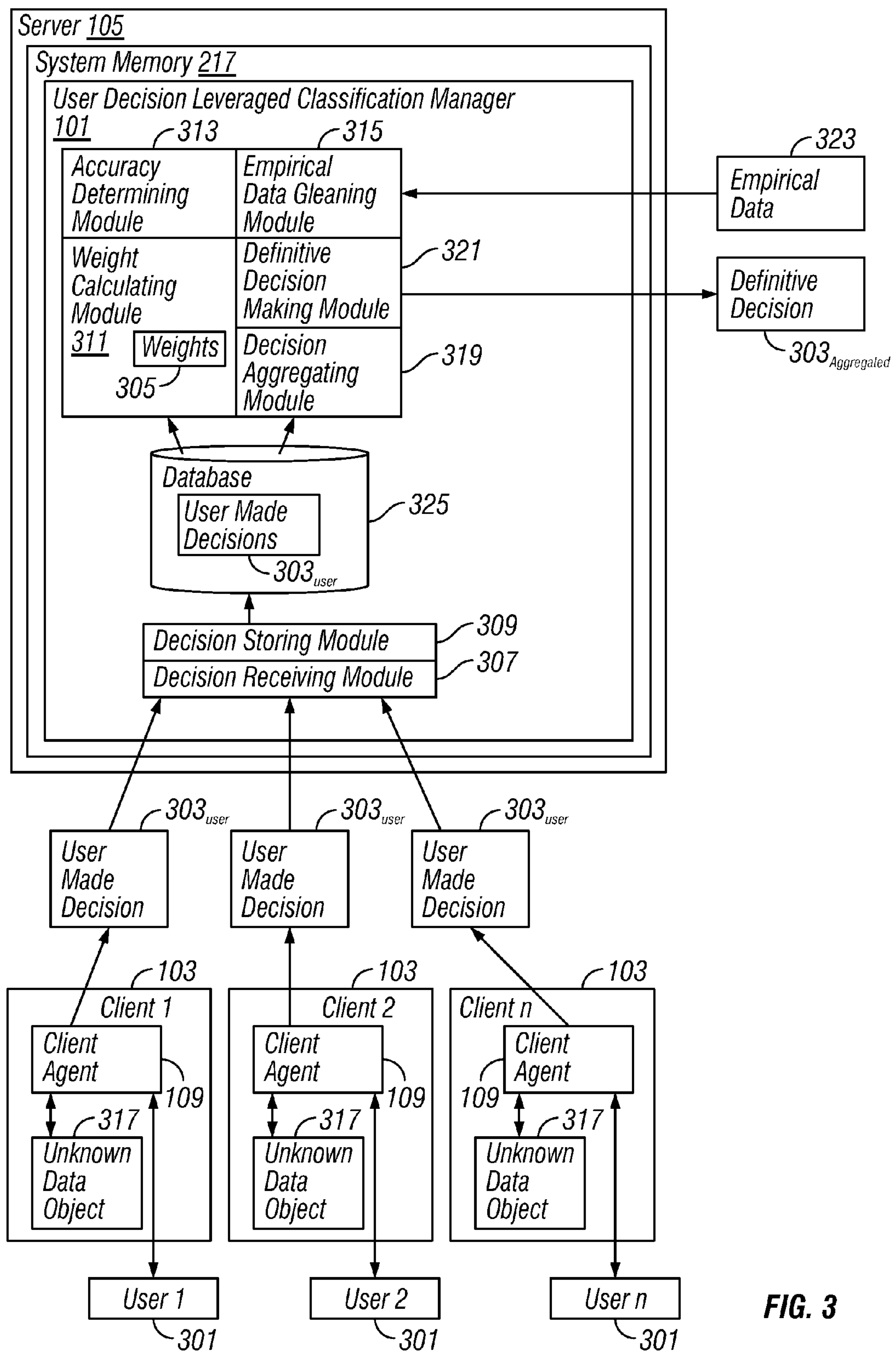

Server 105
System Memory 217
User Decision Leveraged Classification Manager 101
313
315
Accuracy Determining Module
Empirical Data Gleaning Module
Weight Calculating Module 311
Weights
305
Definitive Decision Making Module
321
Decision Aggregating Module
319
323
Empirical Data
Definitive Decision
303 Aggregated
Database
User Made Decisions
303 user
325
Decision Storing Module
309
Decision Receiving Module
307
303 user
User Made Decision
103
Client 1
Client 2
Client n
Client Agent
109
317
Unknown Data Object
User 1
User 2
User n
301
FIG. 3

USING HISTORICAL ACCURACY OF USER DECISION MAKING TO IMPROVE ACCURACY OF PREDICTIVE MODELING BASED AUTOMATIC CLASSIFICATION

TECHNICAL FIELD

This disclosure pertains generally to computer automated predictive modeling, and more specifically to using the historical accuracy of user decision making to improve the accuracy of predictive modeling based automatic classification.

BACKGROUND

The process of predictive modeling attempts to predict a most likely outcome for a given starting condition based on a model. Various models can be used in this context, such as the naive Bayes model, the k-nearest neighbor algorithm, logistic regression, etc. Predictive modeling software technologies can use a ground truth set (i.e., a data set comprising members of a known classification) to train a classifier to automatically classify unknown members of an input data set. For example, where the members of the ground truth set are files known to be either infected with malicious code (malicious files) or to be uninfected (benign files), predictive modeling can be used to train a classification engine to classify files of unknown status (the input data set) as malicious or benign.

Classification of files as malicious or benign is just one example. Predictive modeling based classification can also be used in many other contexts, such as, for example, classifying stocks as buy, sell or hold based on the predicted likelihood of changes in their value, or classifying customers based on the likelihood of their future purchase of a given product.

As useful as these techniques can be, frequently many members of the unknown set (e.g., files) cannot be automatically classified with enough certainty to be definitively labeled (e.g., as malicious or benign). Thus, in real world operation, the classifier either must be tuned to err on the side of false negatives or false positives, neither or which are desirable, or else the classifier cannot automatically make a decision in many instances.

Where the classifier can predict that a given classification is more likely than the other(s) but without a sufficient level of certainty to automatically make the classification, one option is to prompt the user for a second level confirmation. For example, in the case of a malicious file classifier, users are often prompted to allow or deny an operation involving a file that the classifier has determined might be a security risk. Some users are very good at making correct decisions in such cases, whereas others are less so. The accuracy with which different users make such decisions ranges from wrong more often than not to usually right, with a full progression of gradations in between.

It would be desirable to address these issues, and increase the accuracy of predictive modeling based automatic classification.

SUMMARY

A user decision leveraged classification manager uses the historical accuracy of user decision making to improve the accuracy of predictive modeling based automatic classification of unknown data objects, such as the classification of files as being malicious or benign. A plurality of user made decisions concerning unknown data objects are received from a plurality of users. For example, multiple users each operating a remote client computer can be prompted to enter decisions concerning unknown data objects (e.g., decisions to allow or block a file suspected of being malicious). The client computers can then transmit user entered decisions for receipt, for example by a centralized server computer. Each specific user made decision comprises a decision concerning a specific unknown data object made by a specific user, wherein the specific decision could not be made automatically with a sufficient level of confidence without user input. The received user made decisions are stored in a database or other suitable storage mechanism (for example, a database record can comprise a specific user made decision, an identifier of the specific user who made the decision, and temporal information indicating when the decision was made).

Accuracy of the received user made decisions is automatically determined, as empirical data determinative of the accuracy of the decisions becomes available over time. For example, current empirical data determinative of the accuracy of user made decisions can be automatically gleaned from a variety of sources. The accuracy of user made decisions is determined, based on the gleaned empirical data. Associated weights for multiple ones of the plurality of users are automatically calculated, each specific weight being associated with a specific user, and being dynamically calculated based on the determined accuracy of decisions made by the associated user. In one embodiment, automatically calculating a weight associated with a specific user takes the form of dynamically calculating the weight as a function of determined accuracy of decisions made by the user and the amount of time the decisions made by the user have been analyzed for accuracy. In other embodiments, calculating a weight associated with a specific user can encompass calculating the weight as a function of the determined accuracy of decisions made by the user and the rated difficulty and/or the rated importance of the decisions. In one embodiment, the weight associated with a specific user can be automatically modified each time accuracy of a specific decision made by the user is determined. In another embodiment, the weight is automatically modified as a function of a pattern of decisions made by the user over a period of time. In some embodiments, prior to receiving any decisions made by a specific user, that user's weight is initially set to a default value of zero, thereby indicating that the specific user is initially to have no influence on the making of aggregated, definitive decisions.

Multiple user made decisions received from multiple users concerning a specific unknown data object are aggregated. The amount of influence that a specific decision made by a specific user concerning the specific unknown data object has on the aggregating is a function of the weight associated with the specific user. A definitive decision concerning the specific unknown data object is then automatically made without prompting any user for confirmation, based on the aggregating of the user made decisions concerning the specific unknown data object. In one embodiment, aggregating multiple user made decisions received from multiple users concerning a specific unknown data object takes the form of calculating a numerical score based on received user decisions to take a specific action concerning an unknown data object, adjusted for the weights associated with the users that made the decisions to take the specific action. In some embodiments, the numerical score is calculated based on the number and/or percentage of user decisions to take the specific action. In some embodiments, responsive to the numerical score reaching a specific threshold value, a definitive decision is automatically made to take the specific action concerning the unknown data object without prompting any user for confirmation. In another embodiment, a level of certainty in a pre-aggregation classification of an unknown data object is adjusted as a function of the calculated numerical score. A definitive decision to take the specific action concerning the unknown data object indicated by the pre-aggregation classification without prompting any user for confirmation is then made automatically, responsive to the level of certainty reaching a specific threshold value.

Because weights are calculated dynamically as the accuracy of decisions made by associated users are determined, definitive decisions made in response to weighted aggregations can change dynamically. For example, a first definitive decision can be made concerning a specific unknown data object, based on the aggregating of the user made decisions concerning the specific unknown data object. Then, at least one user associated weight can be modified. The multiple user made decisions can be automatically re-aggregated, resulting in a second definitive decision concerning the specific unknown data object being made automatically, based on the re-aggregating of the user made decisions. The first and second definitive decisions can but need not be different from one another. Additionally, in one embodiment, a set of known information concerning data objects can be augmented, responsive to received decisions made by a specific number of users with associated weights indicating a specific level of accuracy in past decision making.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIG. 3 is a block diagram of the operation of a user decision leveraged classification manager, according to some embodiments.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
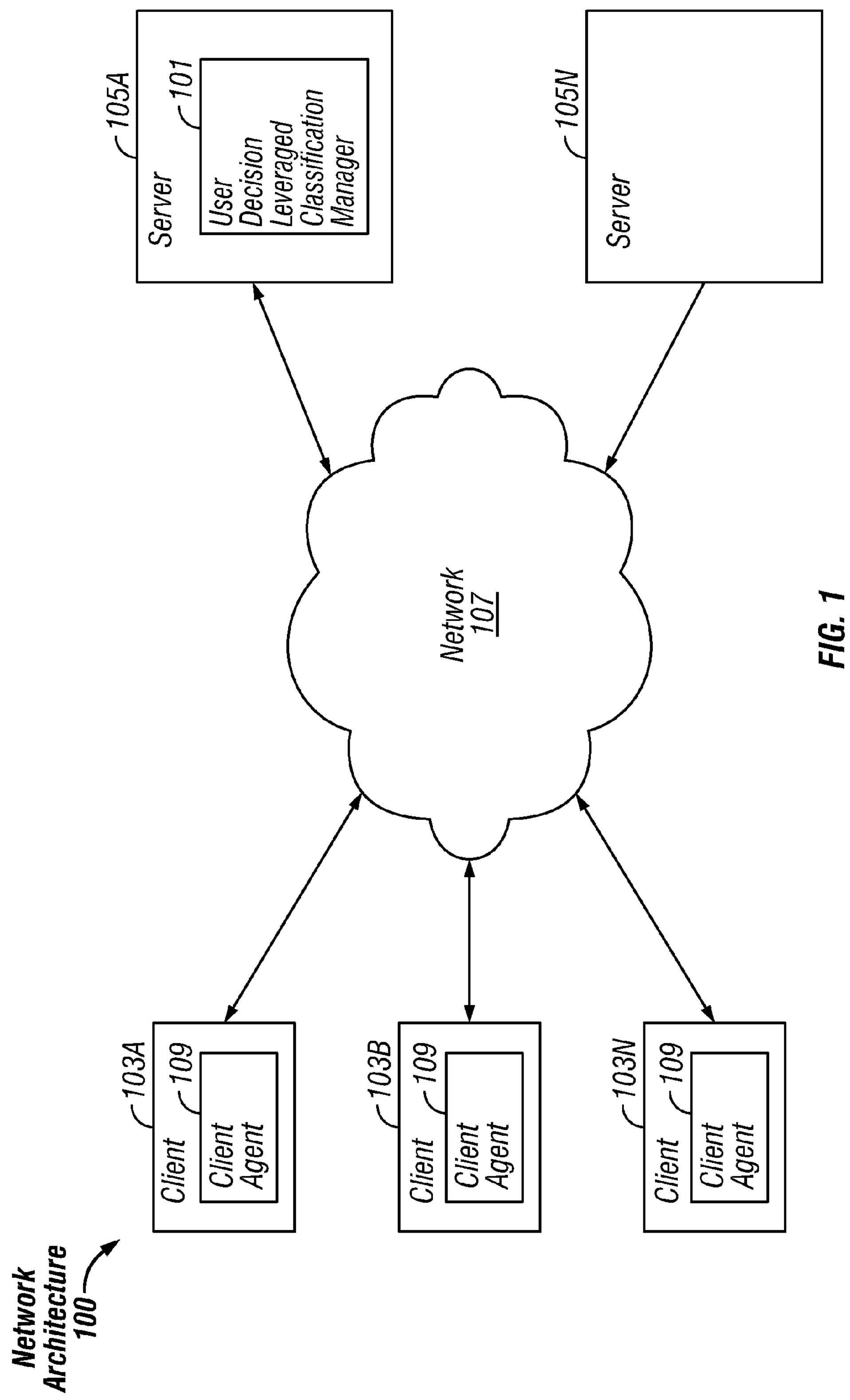
FIG. 1 is a block diagram of an exemplary network architecture in which a user decision leveraged classification manager can be implemented, according to some embodiments.

FIG. 1 is a block diagram illustrating an exemplary network architecture 100 in which a user decision leveraged classification manager 101 can be implemented. The illustrated network architecture 100 comprises multiple clients 103A, 103B and 103N, as well as multiple servers 105A and 105N. In FIG. 1, the user decision leveraged classification manager 101 is illustrated as residing on server 105A, with a separate client agent 109 residing on clients 103A, 103B and 103N. It is to be understood that this is an example only, and in various embodiments various functionalities of this system 101 can be instantiated on a client 103, a server 105, or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown). Clients 103 can but need not be in the form of mobile computing devices, comprising portable computer systems 210 capable of connecting to a network 107 and running applications. Such mobile computing devices are sometimes referred to as smartphones, although many mobile phones not so designated also have these capabilities. Tablet and laptop computers are other examples of mobile computing devices.

Although FIG. 1 illustrates three clients 103 and two servers 105 as an example, in practice many more (or fewer) clients 103 and/or servers 105 can be deployed. In one embodiment, the network 107 is in the form of the Internet. Other networks 107 or network-based environments can be used in other embodiments.

Figure 2:
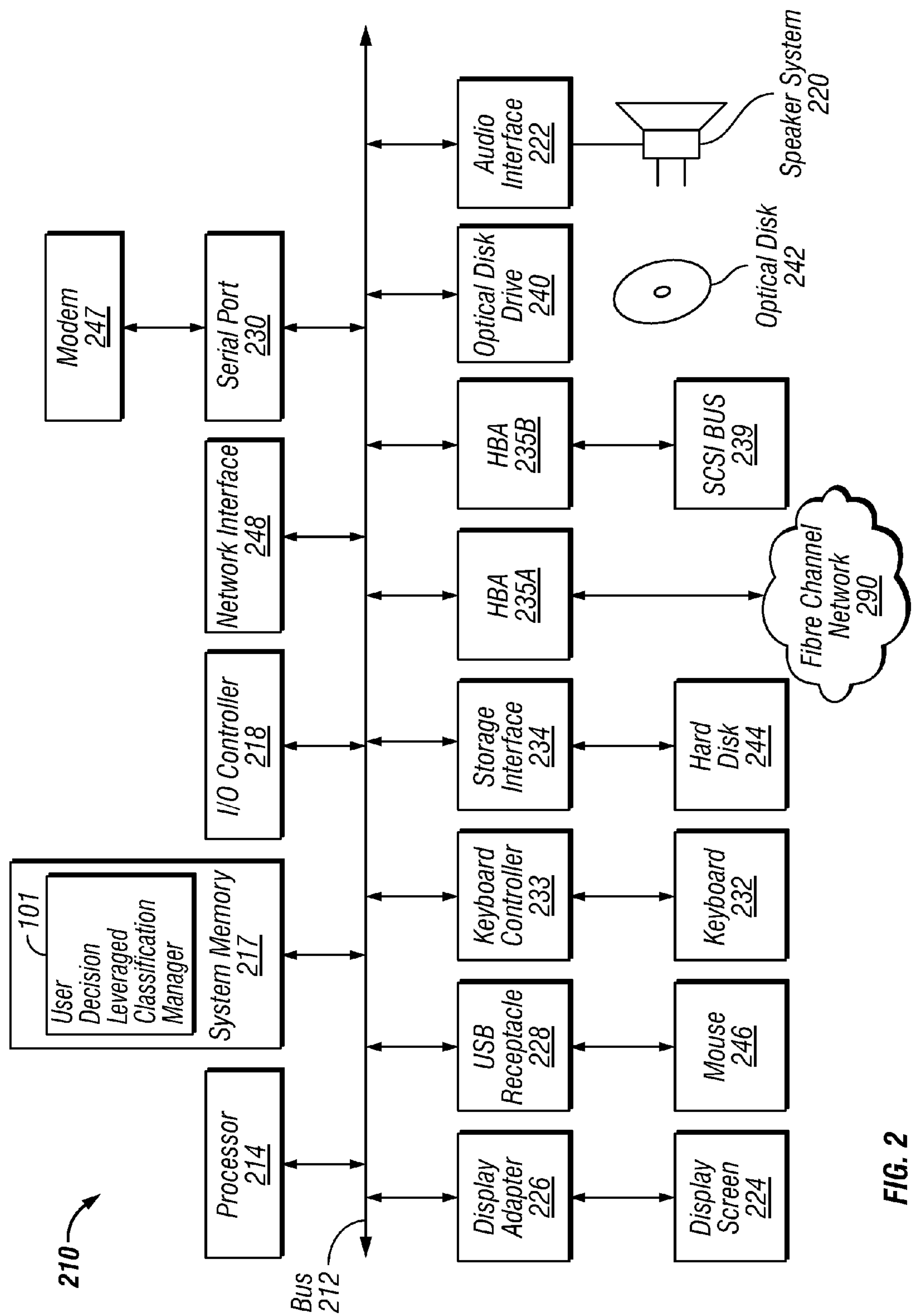
FIG. 2 is a block diagram of a computer system suitable for implementing a user decision leveraged classification manager, according to some embodiments.

FIG. 2 is a block diagram of a computer system 210 suitable for implementing a user decision leveraged classification manager 101. Both clients 103 and servers 105 can be implemented in the form of such computer systems 210. A computer system 210 of the type illustrated in FIG. 2 can but need not be in the form of a mobile computing device. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the user decision leveraged classification manager 101 is illustrated as residing in system memory 217. The workings of the user decision leveraged classification manager 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

FIG. 3 illustrates a user decision leveraged classification manager 101 running in the system memory 217 of a server 105, according to some embodiments. As described above, the functionalities of the user decision leveraged classification manager 101 can reside on a server 105, a client 103 (including but not limited to a client 103 in the form of a mobile computing device), or be distributed between multiple computer systems 210, including within a cloud-based computing environment in which the functionality of the user decision leveraged classification manager 101 is provided as a service over a network 107. It is to be understood that although the user decision leveraged classification manager 101 is illustrated in FIG. 3 as a single entity, the illustrated user decision leveraged classification manager 101 represents a collection of functionalities, which can be instantiated as a single or multiple modules on one or more computing devices 210 as desired. FIG. 3 illustrates a specific embodiment in which the user decision leveraged classification manager 101 is instantiated in the form of specific, multiple modules. In other embodiments, the functionalities of the user decision leveraged classification manager 101 are distributed and/or instantiated in other ways. It is to be understood that the modules of the user decision leveraged classification manager 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the user decision leveraged classification manager 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, a user decision leveraged classification manager 101 runs on a server 105, and a client agent 109 runs on each of three separate clients 103A, 103B and 103N. Although only three clients are depicted for purposes of illustration, it is to be understood that in practice typically many more clients 103 would be deployed, each with its own client agent 109. By receiving user decisions $\mathbf{303}_{user}$ from a large number of client agents 109 over time, the user decision leveraged classification manager 101 is able to track the historical accuracy of the decisions $\mathbf{303}_{user}$ made by different users 301, to automatically calculate and dynamically adjust weights 305 for different users 301 based on the historical accuracy of their decisions $\mathbf{303}_{user}$, and to aggregate weighted decisions $\mathbf{303}_{user}$ made by multiple users 301 to make more accurate definitive decisions $\mathbf{303}_{aggregated}$ concerning unknown data objects 317 automatically.

Each client agent 109 prompts users 301 to participate in predictive modeling based decisions 303 when a decision 303 cannot otherwise be made with a sufficient level of confidence for a given capacity. Such decisions 303 can concern any type of unknown data object 317. As the term is used herein, an "unknown data object" means a unit of data about which a definitive decision has not been made. "Definitive decision," as the term is used herein, means a decision made with a sufficient degree of certainty so as not to prompt any user for a second level confirmation. For example, users 301 can be prompted to allow or deny operations involving specific files (e.g., allow download of file, allow file to execute, allow file to access a given resource or perform a specific operation) when the files cannot otherwise be automatically classified as malicious or benign with a desired degree of certainty. It is to be understood that what level of certainty is considered sufficient to make a given decision 303 without prompting a user 301 for a second level confirmation is a design parameter that can vary between embodiments and decision contexts (e.g., a prediction that a given file is 99% likely to be benign, that the value of a given stock is 85% likely to raise or that a given customer is 75% likely to buy a given product). Where a user 301 is prompted to enter a decision $\mathbf{303}_{user}$, the client agent 109 transmits the user's decision $\mathbf{303}_{user}$ (e.g., an indication that a specific user 301 decided to deny access to a specific file) and in some cases additional contextual information (e.g., temporal information such as date and time) to the user decision leveraged classification manager 101 over the network 107.

A decision receiving module 307 of the user decision leveraged classification manager 101 receives user entered decisions $\mathbf{303}_{user}$ from multiple client agents 109. Thus, the decision receiving module 307 receives multiple user made decisions $\mathbf{303}_{user}$ concerning classification of data objects from multiple remotely located users 301. As explained above, the user made decisions $\mathbf{303}_{user}$ are decisions 303 that could not be made automatically without user input at a client level with a sufficient level of confidence, and thus user input was requested. A decision storing module 309 of the user decision leveraged classification manager 101 stores the received user entered decisions $\mathbf{303}_{user}$, for example in a database 325 or other suitable storage mechanism. The decisions $\mathbf{303}_{user}$ are stored with enough information to track which user 301 made what decision $\mathbf{303}_{user}$. For example, a stored decision $\mathbf{303}_{user}$ could indicate that a specific user 301 (identified by, e.g., user name) decided that a specific file was malicious (e.g., the user 301 decided to block the file). In some embodiments the decision storing module 309 also stores additional information such as when given decisions $\mathbf{303}_{user}$ were made.

A weight calculating module 311 of the user decision leveraged classification manager 101 automatically calculates weights 305 for each user 301 based on the historical accuracy of the user's decisions $\mathbf{303}_{user}$ over time, the determination of which is described in detail below. As also described below, in some embodiments, other factors also contribute to the calculation of the weights 305, such as the amount of time a user's decisions $\mathbf{303}_{user}$ have been analyzed for accuracy. Initially, before a giver user 301 has any history of tracked decisions $\mathbf{303}_{user}$, the weight calculating module 311 sets the user's weight 305 to a default value indicating that the given user 301 is to have no influence on the making of aggregated, definitive decisions $\mathbf{303}_{aggregated}$ (e.g., user's weight equals zero).

An accuracy determining module 313 of the user decision leveraged classification manager 101 automatically determines the accuracy of stored user decisions $\mathbf{303}_{user}$ over time. More specifically, with the passage of time, the accuracy of previously entered user decisions $\mathbf{303}_{user}$ can be empirically determined, as more information becomes available. For example, whereas it may be unknown whether a given piece of shareware is malicious or benign when it first starts appearing "in the wild," after the program has been in circulation for awhile, it might be definitively identified as a virus. Thus, where specific users 301 previously made decisions $\mathbf{303}_{user}$ blocking the program, those decisions $\mathbf{303}_{user}$ can be identified as having been right, whereas previous decisions $\mathbf{303}_{user}$ by other users 301 to allow the program to operate can be identified as having been wrong. In another example, decisions $\mathbf{303}_{user}$ to buy, hold or sell stocks within given future time periods can subsequently be classified as right or wrong depending upon the actual performance of the stocks in question during the time periods, after the fact.

Using this methodology, the accuracy determining module 313 automatically determines the accuracy of user decisions $\mathbf{303}_{user}$ as the requisite empirical data 323 becomes available. To support the making of these determinations, an empirical data gleaning module 315 of the user decision leveraged classification manager 101 can automatically glean current empirical data 323 determinative of the accuracy of user decisions $\mathbf{303}_{user}$. For example, in the specific example use case of classifying files as malicious or benign, the empirical data gleaning module 315 can automatically obtain the most current listings of known malicious files, for example from a central security server. In the use case example of picking stocks, the empirical data gleaning module 315 can automatically obtain current stock price data from a live feed. These are just examples, and in other use cases the empirical data gleaning module 315 automatically gleans other types of empirical data 323 from other sources as it becomes available.

The weight calculating module 311 subsequently automatically adjusts the weights 305 associated with each user 301 as a function of the accuracy of the respective user's decisions $\mathbf{303}_{user}$. In one embodiment, each time the accuracy of a given decision $\mathbf{303}_{user}$ is determined based on gleaned empirical data 323, the weight calculating module 311 modifies the given user's associated weight 305 accordingly. In other embodiments, weights 305 are not adjusted based on single decisions $\mathbf{303}_{user}$, but instead on patterns of decisions $\mathbf{303}_{user}$ made over time (e.g., three correct decisions $\mathbf{303}_{user}$ within five days, or a given percentage of decisions $\mathbf{303}_{user}$ being correct). Generally, correct user decisions $\mathbf{303}_{user}$ result in increasing the weight 305 associated with the given user 301, whereas incorrect user decisions $\mathbf{303}_{user}$ result in decreasing the weight 305, such that the more often a specific user 305 is right, the higher the user's weight 305 and vice versa.

The specific amount to raise and lower weights 305 based on specific decisions $\mathbf{303}_{user}$ and decision $\mathbf{303}_{user}$ patterns over time is a design parameter that varies between embodiments. For example, in one embodiment, for each correct decision $\mathbf{303}_{user}$ a user 301 makes, the weight determining module 311 automatically increases the user's weight 305 by a specific amount. In another embodiment, the amount by which a user's weight 305 is increased for making a correct decision $\mathbf{303}_{user}$ itself increases as a function of the specific user 301 making multiple correct decisions over time, such that a user's weight 305 increases exponentially as the user 301 makes more and more correct decisions $\mathbf{303}_{user}$ over time. Weights 305 can also be decreased (e.g., linearly or logarithmically) as users make incorrect decisions $\mathbf{303}_{user}$. In some embodiments, making different decisions $\mathbf{303}_{user}$ correctly and/or incorrectly can affect weights 305 by different amounts, based on factors such as rated difficulty or importance of the decision $\mathbf{303}_{user}$. For example, a user 301 having correctly classified a specific file as being malicious can be worth more when a smaller percentage of users 301 made the correct classification and progressively less as higher percentages of users 301 did so, as decisions $\mathbf{303}_{user}$ that fewer users 301 made correctly are rated as being to be more difficult. In another example, correctly classifying a stock as buy can be weighted more heavily the more the value of the stock actually goes up, as decisions 303 resulting in greater gains are rated as being more important.

The automatic adjustment of weights 305 associated with specific users 301 as a function of the accuracy of their decisions $\mathbf{303}_{user}$ over time can be thought of as "learning" correct weights 305 for these users 305 on the basis of the correctness of their past decisions $\mathbf{303}_{user}$. It is to be noted that the weight calculating module 311 can learn these weights 305 automatically, without receiving input from a person. To that end, in different embodiments the weight determining module 311 can apply various machine learning techniques to learn weights 305 for users 301 on the basis of their predictive accuracy. As described in detail below, the weights 305 of the different users 301 can be aggregated in an ensemble approach to improve the accuracy of the classification of unknown data objects 317. In an ensemble model, each user 301 can be thought of as a base classifier.

In some embodiments, the weight calculating module 311 factors criteria other than historical accuracy of a user's decision making into calculating associated weights 305. For example in one embodiment, a user's weight 305 is increased (e.g., linearly or exponentially) in accordance with the amount of time the user's decisions $\mathbf{303}_{user}$ have been tracked. In one embodiment, a user's weight 305 is not adjusted from its initial neutral value until the user's decisions $\mathbf{303}_{user}$ have been tracked for a requisite amount of time (e.g., an hour, a day, a week, a month, etc.) and/or until the user 301 has made a requisite number of decisions $\mathbf{303}_{user}$ (e.g., five, ten, fifty, one hundred). Examples of other criteria that can affect weight 305 are (in the example use case of identification of malicious files), the user's history of infection with malicious code, the hygiene of the user's computer 210, etc.

A decision aggregating module 319 of the user decision leveraged classification manager 101 can aggregate decisions $\mathbf{303}_{user}$ made by multiple users 301, such that a definitive decision making module 321 of the user decision leveraged classification manager 101 can automatically make an aggregated, definitive decision $\mathbf{303}_{aggregated}$ concerning an unknown data object 317. The weights 305 of the various users 301 can determine to what extent (if at all) a given decision $\mathbf{303}_{user}$ by a specific user 301 informs the aggregation, and hence the definitive decision $\mathbf{303}_{aggregated}$. For example, in a malicious code detection use case, suppose a file is encountered which an associated anti-malware system package can only classify as being 85% likely to be benign without taking user decisions $\mathbf{303}_{user}$ into account. In this specific example scenario, 85% certainty is not sufficient to allow the file to be downloaded or run without prompting the users 301 for confirmation. However, once a sufficient number of users 301 (taking into account user weights 305) have approved this file (i.e., decided it is benign) responsive to being prompted, the definitive decision making module 321 then automatically makes a decision $\mathbf{303}_{aggregated}$ that the file is benign without any additional prompting of users 301, based on the aggregation of the multiple user decisions $\mathbf{303}_{user}$ to this effect. In some embodiments, the definitive decision making module 321 of the user decision leveraged classification manager 101 uses the aggregation of the individual user decisions $\mathbf{303}_{user}$ as one of multiple factors in the making of the definitive decision $\mathbf{303}_{aggregated}$. It is to be understood that the utilization of the weighted user decisions $\mathbf{303}_{user}$ described herein improves the accuracy of the classification of unknown data objects 317, sometimes to the point where a definitive decision $\mathbf{303}_{aggregated}$ can be taken without prompting users 301 for a secondary level confirmation. This aggregated decision making can occur at the server 105 level, as illustrated in FIG. 3, or can be distributed to client level decision engines (not illustrated).

It is to be understood that the specific criteria used to determine when to make a definitive decision $\mathbf{303}_{aggregated}$ based on aggregated user decisions $\mathbf{303}_{user}$ is a design parameter, and varies between embodiments. In one embodiment, the decision aggregating module 319 can calculate a numerical score based on the number (or percentage) of user decisions $\mathbf{303}_{user}$ to take a specific action concerning an unknown data object 317 (e.g., allow a specific file to be downloaded, pick a given stock), adjusted for the weights 305 of the users 301. Where this numerical score reaches a given threshold (the specific value of which is a variable design parameter), the definitive decision making module 319 automatically makes a definitive decision $\mathbf{303}_{aggregated}$ to take that action without further user prompting. In one embodiment, as the numerical score increases (or decreases), the level of certainty in the pre-aggregation classification of the unknown data object 317 is increased (or decreased) accordingly. In this embodiment, the definitive decision making module 319 automatically makes the definitive decision $\mathbf{303}_{aggregated}$ indicated by the pre-aggregation classification without user prompting responsive to the level of certainty reaching a given threshold value considered sufficient in that context, the specific value of which is a variable design parameter.

Because weights are adjusted dynamically based on the correctness of user decisions $\mathbf{303}_{user}$ over time, definitive decisions $\mathbf{303}_{aggregated}$ based on aggregations can automatically change dynamically as well. Put more generally, once a user's weight 305 has been learned as described above, the user's subsequent decisions $\mathbf{303}_{user}$ can be aggregated with decisions $\mathbf{303}_{user}$ from other users 301, with the extent of the influence of each user's decisions $\mathbf{303}_{user}$ on the final aggregated decisions $\mathbf{303}_{aggregated}$ being a function of the respective user's weight 305. As new weights 305 for a user are learned over time (i.e., as the user's weight 305 is adjusted up and down), the affect of that user's decisions $\mathbf{303}_{user}$ on definitive decisions $\mathbf{303}_{aggregated}$ waxes and wanes accordingly, and hence the result of a given definitive decision $\mathbf{303}_{aggregated}$ can also change.

This approach leverages individual users 301 as base classifiers in an ensemble approach, in which the decisions $\mathbf{303}_{user}$ made by independent and identically distributed (IID) classifiers (the users 301) are aggregated into a single result. A learning ensemble "learns" weights 305 to associate with each classifier on the basis of the accuracy of the classifier's decisions $\mathbf{303}_{user}$ over time. In a linear regression model, the weights 305 are constants assigned to each base classifier. Given the accuracy of the predictions of the base classifiers on a test set (i.e., the unknown data objects 317 encountered in the wild), the weights 305 are learned, and applied in the computation of the aggregated result.

In some embodiments, as opposed to or in addition to aggregating user decisions $\mathbf{303}_{user}$ to make definitive decisions $\mathbf{303}_{aggregated}$, those decisions $\mathbf{303}_{user}$ made by sufficiently accurate users 301 can be used to augment the ground truth set (i.e., the set of known information concerning data objects, such as, for example, files known to be malicious or benign) automatically. This can be thought of as automatically using sufficiently correct users 301 to label unlabeled data (e.g., label files as malicious or benign). For example, if a specific requisite number of specific users 301 who have a sufficiently well established track record of making correct decisions (as indicated by weights indicating a specific level of accuracy in past decision making) decide to deny a file, it can be concluded that the file is malicious on the strength of the weights 305 of the users 301. The ground truth set is then updated accordingly. The specific number of users 301 and specific associated weights 305 to use to make such determinations varies between embodiments.

It is to be understood that the use cases described herein of classifying files as malicious or benign and picking stocks are examples only. The user decision leverage classification manager 101 can be used in any context in which decisions 303 in which users participate are made, provided that the accuracy of the decisions 303 can later be learned empirically over time.

Figure 4:
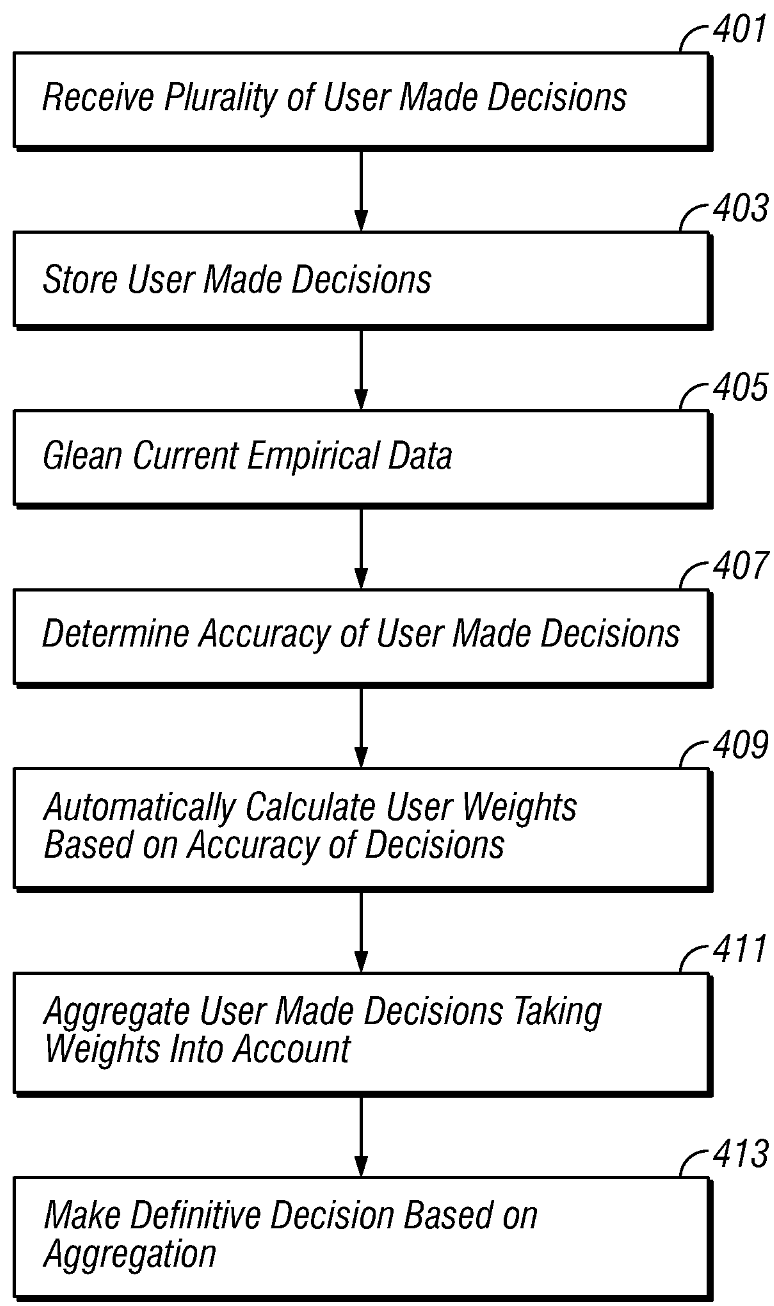
FIG. 4 is a flowchart of the operation of a user decision leveraged classification manager, according to some embodiments.

FIG. 4 is a flowchart showing steps of the operation of the user decision leveraged classification manager 101, according to some embodiments. The decision receiving module 307 receives 401 a plurality of user made decisions $\mathbf{303}_{user}$ concerning unknown data objects 317 from a plurality of users 301. (Each decision $\mathbf{303}_{user}$ was made by a specific user 301 and concerns a specific unknown data object 317, wherein the specific decision 303 could not be made automatically with a sufficient level of confidence without user 301 input.) The decision storing module 309 stores 403 the plurality of user made decisions $\mathbf{303}_{user}$ received from the plurality of users 301. The empirical data gleaning module 315 automatically gleans 405 current empirical data 323 determinative of the accuracy of user decisions $\mathbf{303}_{user}$. The accuracy determining module 313 automatically determines 407 accuracy of received user made decisions $\mathbf{303}_{user}$, as empirical data 323 determinative of the accuracy of the user made decisions $\mathbf{303}_{user}$ becomes available over time. The weight calculating module 311 automatically calculates 409 weights 305 associated with specific users 301, each specific weight 305 being dynamically calculated based on the determined accuracy of decisions $\mathbf{303}_{user}$ made by the associated specific user 301. The decision aggregating module 319 aggregates 411 decisions $\mathbf{303}_{user}$ made by multiple users 301 concerning a specific unknown data object 317, taking into account the associated user weights 305. The definitive decision making module 321 automatically makes 413 a definitive decision $\mathbf{303}_{aggregated}$ concerning the specific unknown data object 317 without prompting any user 301 for confirmation, based on the aggregating of the user made decisions $\mathbf{303}_{user}$ concerning the specific unknown data object 317.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for creating and using an iterative predicative module for automatic classification of unknown data objects, using historical accuracy of decision making by multiple ones of a plurality of users to iteratively improve accuracy over time of the predictive model for automatic classification of unknown data objects, the method comprising:

receiving, by a computer, a plurality of user made decisions concerning unknown data objects from a plurality of users, wherein each specific user made decision comprises a decision concerning a specific unknown data object made by a specific user, wherein the specific decision could not be made automatically with a sufficient level of confidence without user input;

storing, by the computer, the plurality of user made decisions received from the plurality of users;

automatically determining, by the computer, whether specific previously made user decisions were right or wrong, based on empirical data determinative of accuracy of the specific previously made user decisions, the empirical data not having been available at times when the specific user decisions were previously made but subsequently became available over time;

automatically calculating, by the computer, associated weights for multiple ones of the plurality of users, each specific weight being associated with a specific user, each specific weight being dynamically calculated and dynamically adjusted based on whether previously made decisions received from the associated specific user were determined to be right or wrong, based on empirical data determinative of accuracy of the previously made decisions received from the associated specific user, the empirical data not having been available at times when the decisions received from the associated specific user were previously made but subsequently became available over time, wherein more accurate weights are iteratively calculated for multiple ones of the plurality of users, as more empirical data determinative of accuracy of previously made decisions from associated specific users becomes available;

aggregating, by the computer, multiple user made decisions received from multiple users over time concerning specific unknown data objects, an amount of influence that a specific decision made by a specific user concerning a specific unknown data object has on the aggregating being a function of the weight associated with the specific user; and automatically making, by the computer, definitive decisions concerning the specific unknown data objects without prompting any user for confirmation, based on the aggregating of the user made decisions concerning the specific unknown data objects, wherein accuracy of automatically made decisions iteratively improves over time as more accurate weights are calculated.

2. The method of claim 1 wherein automatically determining whether specific previously made user decisions were right or wrong further comprises:

automatically gleaning current empirical data determinative of the accuracy of the specific previously made user decisions; and determining whether specific previously made user decisions were right or wrong, based on the gleaned empirical data.

3. The method of claim 1 wherein automatically calculating a weight associated with a specific user further comprises:

dynamically calculating the weight associated with the specific user as a function of determined accuracy of decisions made by the specific user and an amount of time the decisions made by the specific user have been analyzed for accuracy.

4. The method of claim 1 wherein automatically calculating a weight associated with a specific user further comprises:

dynamically calculating the weight associated with the specific user as a function of determined accuracy of decisions made by the specific user and rated difficulty of decisions made by the specific user.

5. The method of claim 1 wherein automatically calculating a weight associated with a specific user further comprises:

dynamically calculating the weight associated with the specific user as a function of determined accuracy of decisions made by the specific user and rated importance of decisions made by the specific user.

6. The method of claim 1 wherein automatically calculating a weight associated with a specific user further comprises:

automatically modifying the weight associated with the specific user each time accuracy of a specific decision made by the specific user is determined.

7. The method of claim 1 wherein automatically calculating a weight associated with a specific user further comprises:

automatically modifying the weight associated with the specific user as a function of a pattern of decisions made by the specific user over a period of time.

8. The method of claim 1 wherein automatically calculating a weight associated with a specific user further comprises:

prior to receiving any decisions made by the specific user, initially setting the weight associated with the specific user to a default value indicating that the specific user is to have no influence on the making of definitive decisions.

9. The method of claim 1 wherein aggregating multiple user made decisions received from multiple users over time concerning specific unknown data objects further comprises:

calculating a numerical score based on user decisions to take a specific action concerning an unknown data object, adjusted for the weights associated with the users that made the decisions to take the specific action.

10. The method of claim 9 wherein calculating a numerical score based on user decisions to take a specific action concerning an unknown data object further comprises:

calculating the numerical score based on a number of user decisions to take the specific action concerning the unknown data object.

11. The method of claim 9 wherein calculating a numerical score based on user decisions to take a specific action concerning an unknown data object further comprises:

calculating the numerical score based on a percentage of user decisions to take the specific action concerning the unknown data object.

12. The method of claim 9 further comprising:

automatically making a definitive decision to take the specific action concerning the unknown data object without prompting any user for confirmation, responsive to the numerical score reaching a specific threshold value.

13. The method of claim 9 further comprising:

adjusting a level of certainty in a pre-aggregation classification of an unknown data object as a function of the calculated numerical score; and automatically making a definitive decision to take a specific action concerning the unknown data object indicated by the pre-aggregation classification without prompting any user for confirmation, responsive to the level of certainty reaching a specific threshold value.

14. The method of claim 1 further comprising:

automatically making a first definitive decision concerning a specific unknown data object, based on the aggregating of the user made decisions concerning the specific unknown data object;

automatically modifying at least one user associated weight;

automatically re-aggregating multiple user made decisions received from the multiple users concerning the specific unknown data object; and automatically making a second definitive decision concerning the specific unknown data object, based on the re-aggregating of the user made decisions concerning the specific unknown data object, the first definitive decision not being equal to the second definitive decision.

15. The method of claim 1 further comprising:

automatically augmenting a set of known information concerning data objects, responsive to received decisions made by a specific number of users with associated weights indicating a specific level of accuracy in past decision making.

16. The method of claim 1 further comprising:

prompting users to enter decisions concerning unknown data objects, by a plurality of client computers; and transmitting the user entered decisions to a server computer, by the plurality of client computers.

17. The method of claim 1 wherein storing received user made decisions further comprises:

storing received user made decisions, identifiers of specific users who made specific decisions, and temporal information concerning specific user made decisions.

18. The method of claim 1 wherein:

unknown data objects further comprise files; and decisions concerning unknown data objects further comprise decisions classifying files as being malicious or as being benign.

19. At least one non-transitory computer readable-storage medium for creating and using an iterative predicative module for automatic classification of unknown data objects, using historical accuracy of decision making by multiple ones of a plurality of users to iteratively improve accuracy over time of the predictive model for automatic classification of unknown data objects, the at least one non-transitory computer readable-storage medium storing computer executable instructions that, when loaded into computer memory and executed by at least one processor of a computing device, cause the computing device to perform the following steps:

receiving a plurality of user made decisions concerning unknown data objects from a plurality of users, wherein each specific user made decision comprises a decision concerning a specific unknown data object made by a specific user, wherein the specific decision could not be made automatically with a sufficient level of confidence without user input;

storing the plurality of user made decisions received from the plurality of users;

automatically determining whether specific previously made user decisions were right or wrong, based on empirical data determinative of accuracy of the specific previously made user decisions, the empirical data not having been available at times when the specific user decisions were previously made but subsequently became available over time;

automatically calculating, by the computer, associated weights for multiple ones of the plurality of users, each specific weight being associated with a specific user, each specific weight being dynamically calculated and dynamically adjusted based on whether previously made decisions received from the associated specific user were determined to be right or wrong, based on empirical data determinative of accuracy of the previously made decisions received from the associated specific user, the empirical data not having been available at times when the decisions received from the associated specific user were previously made but subsequently became available over time, wherein more accurate weights are iteratively calculated for multiple ones of the plurality of users, as more empirical data determinative of accuracy of previously made decisions from associated specific users becomes available;

aggregating multiple user made decisions received from multiple users over time concerning specific unknown data objects, an amount of influence that a specific decision made by a specific user concerning a specific unknown data object has on the aggregating being a function of the weight associated with the specific user; and automatically making definitive decisions concerning the specific unknown data objects without prompting any user for confirmation, based on the aggregating of the user made decisions concerning the specific unknown data objects, wherein accuracy of automatically made decisions iteratively improves over time as more accurate weights are calculated.

20. A computer system for using historical accuracy of decision making by multiple ones of a plurality of users to improve the accuracy of predictive modeling based automatic classification of unknown data objects, the computer system comprising:

computer memory;

a decision receiving module residing in the computer memory, the decision receiving module being programmed to receive a plurality of user made decisions concerning unknown data objects from a plurality of users, wherein each specific user made decision comprises a decision concerning a specific unknown data object made by a specific user, wherein the specific decision could not be made automatically with a sufficient level of confidence without user input;

a decision storing module residing in the computer memory, the decision storing module being programmed to store the plurality of user made decisions received from the plurality of users;

an accuracy determining module residing in the computer memory, the accuracy determining module being programmed to automatically determine whether specific previously made user decisions were right or wrong, based on empirical data determinative of accuracy of the specific previously made user decisions, the empirical data not having been available at times when the specific user decisions were previously made but subsequently became available over time;

a weight calculating module residing in the computer memory, the weight calculating module being programmed to automatically calculate associated weights for multiple ones of the plurality of users, each specific weight being associated with a specific user, each specific weight being dynamically calculated and dynamically adjusted based on whether previously made decisions received from the associated specific user were determined to be right or wrong, based on empirical data determinative of accuracy of the previously made decisions received from the associated specific user, the empirical data not having been available at times when the decisions received from the associated specific user were previously made but subsequently became available over time, wherein more accurate weights are iteratively calculated for multiple ones of the plurality of users, as more empirical data determinative of accuracy of previously made decisions from associated specific users becomes available;

a decision aggregating module residing in the computer memory, the decision aggregating module being programmed to aggregate multiple user made decisions received from multiple users over time concerning specific unknown data objects, an amount of influence that a specific decision made by a specific user concerning a specific unknown data object has on the aggregating being a function of the weight associated with the specific user;

a definitive decision making module residing in the computer memory, the definitive decision making module being programmed to automatically make definitive decisions concerning the specific unknown data objects without prompting any user for confirmation, based on the aggregating of the user made decisions concerning the specific unknown data objects, wherein accuracy of automatically made decisions iteratively improves over time as more accurate weights are calculated; and at least one processor configured to execute the modules.

* * * * *